US012601831B2

(12) United States Patent
Yogamani et al.

(10) Patent No.: US 12,601,831 B2
(45) Date of Patent: Apr. 14, 2026

(54) RADAR AND CAMERA FUSION FOR VEHICLE APPLICATIONS

(71) Applicant: QUALCOMM Incorporated, San Diego, CA (US)

(72) Inventors: Senthil Kumar Yogamani, Headford (IE); Varun Ravi Kumar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/463,049

(22) Filed: Sep. 7, 2023

(65) Prior Publication Data
US 2025/0085413 A1     Mar. 13, 2025

(51) Int. Cl.
| | |
|---|---|
| *G01S 13/86* | (2006.01) |
| *G01S 7/35* | (2006.01) |
| *G01S 7/41* | (2006.01) |
| *G01S 13/931* | (2020.01) |

(52) U.S. Cl.
CPC ............ *G01S 13/867* (2013.01); *G01S 7/354* (2013.01); *G01S 7/417* (2013.01); *G01S 13/931* (2013.01)

(58) Field of Classification Search
None
See application file for complete search history.

(56) References Cited

U.S. PATENT DOCUMENTS

| | | | | |
|---|---|---|---|---|
| 10,176,405 | B1 * | 1/2019 | Zhou ....................... | H04N 7/181 |
| 11,222,217 | B1 * | 1/2022 | Zhang ................... | G06F 18/214 |

| | | | | |
|---|---|---|---|---|
| 2011/0169957 | A1 * | 7/2011 | Bartz ........................ | B60R 1/31 |
| | | | | 348/149 |
| 2019/0100144 | A1 * | 4/2019 | Asayama ................ | B60R 11/04 |
| 2019/0122103 | A1 * | 4/2019 | Gao ........................ | G06V 20/46 |
| 2019/0311223 | A1 * | 10/2019 | Wang .................... | G06F 18/251 |
| 2021/0358137 | A1 * | 11/2021 | Lee ......................... | G06N 3/045 |
| 2022/0303505 | A1 * | 9/2022 | Itoh ........................... | B60R 1/27 |
| 2023/0071437 | A1 * | 3/2023 | Kim ....................... | G01S 17/89 |
| 2023/0260266 | A1 * | 8/2023 | Karasev ................ | G01S 13/931 |
| | | | | 382/104 |

OTHER PUBLICATIONS

A. Vaswani et al; "Attention Is All You Need"; Proceedings of the 31st Conference on Neural Information Processing Systems; Long Beach, CA, USA; published in the year 2017. (Year: 2017).*

(Continued)

*Primary Examiner* — Bernarr E Gregory
(74) *Attorney, Agent, or Firm* — Norton Rose Fulbright US LLP/QUALCOMM Incorporated

(57) ABSTRACT

This disclosure provides systems, methods, and devices for vehicle driving assistance systems that support image processing. In a first aspect, a method of image processing includes receiving image BEV features and receiving first radio detection and ranging (RADAR) BEV features. The first RADAR BEV features that are received are determined based on first RADAR data associated with a first data type. First normalized RADAR BEV features are determined, which includes rescaling the first RADAR BEV features using a first attention mechanism based on the image BEV features and the first RADAR BEV features. Fused data is determined that combines the first normalized RADAR BEV features and the image BEV features. Other aspects and features are also claimed and described.

30 Claims, 7 Drawing Sheets

(56) References Cited

OTHER PUBLICATIONS

"Brand Guide for Bluetooth Trademarks"; no author given; published by the Bluetooth Special Interest Group; Kirkland, Washington, USA; posted on the Internet at bluetooth.com; dated Jun. 2022. (Year: 2022).*

G. Brauwers et al., "A General Survey on Attention Mechanisms in Deep Learning"; arXiv:2203.14263v1; Mar. 27, 2022. (Year: 2022).*

"Who We Are: Our Brands"; no author given; published by the Wi-Fi Alliance; Austin, TX, USA; posted on the Internet at wi-fi. org; copyright in the year 2024. (Year: 2024).*

"Guidance for use of the LTE logo"; no author given; published by 3GPP Partners; Sophia Antipolis, France; posted on the Internet at 3gpp.org; accessed in the year 2024. (Year: 2024).*

* cited by examiner

*700*

RECEIVE IMAGE BEV FEATURES — 702

RECEIVE FIRST RADAR BEV FEATURES — 704

DETERMINE FIRST NORMALIZED RADAR BEV FEATURES — 706

DETERMINE FUSED DATA — 706

RADAR AND CAMERA FUSION FOR VEHICLE APPLICATIONS

TECHNICAL FIELD

Aspects of the present disclosure relate generally to driver-operated or driver-assisted vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road.

Different RADAR systems output different types of data format representations. As such, after extracting RADAR BEV features from each of these different data format types, the range of the feature map values and the number of feature maps will be different among the different data format types due to the diverse characteristics of each of the different data format types. Additionally, it is not possible to radiometrically normalize and align these RADAR BEV features in a single model. Example embodiments of the present disclosure provide techniques for transforming RADAR data, irrespective of data format type, to a common format, such as birds eye view (BEV) format, so that the transformed RADAR data can be fused with other data in the common format, such as image data BEV features. The fused data can thereafter be used for 3D object detection. In some embodiments, two or more different data format types of RADAR data can be fused with, e.g., image data BEV features using the provided techniques.

The camera-RADAR fusion of the present disclosure leverages ground-truth annotations of a camera and guides mapping the different RADAR data format types to BEV features with the camera's BEV grid features. In this way, the present techniques provide a single framework for radiometric normalization of the RADAR features of different RADAR data format types to a standard range of values using the camera's BEV feature range. This radiometric normalization mechanism enables the data from different RADAR sensors to be compared and combined effectively.

In one aspect of the disclosure, a method for image processing includes receiving image BEV features and receiving first radio detection and ranging (RADAR) BEV features. The first RADAR BEV features that are received are determined based on first RADAR data associated with a first data type. First normalized RADAR BEV features are determined, which includes rescaling the first RADAR BEV features using a first attention mechanism based on the image BEV features and the first RADAR BEV features. Fused data is determined that combines the first normalized RADAR BEV features and the image BEV features.

In an additional aspect of the disclosure, an apparatus includes at least one processor and a memory coupled to the at least one processor. The at least one processor is configured to perform operations including receiving image BEV features and first radio detection and ranging (RADAR) BEV features. The first RADAR BEV features that are received are determined based on first RADAR data associated with a first data type. First normalized RADAR BEV features are determined, which includes rescaling the first RADAR BEV features using a first attention mechanism based on the image BEV features and the first RADAR BEV features. Fused data is determined that combines the first normalized RADAR BEV features and the image BEV features.

In an additional aspect of the disclosure, a non-transitory computer-readable medium stores instructions that, when executed by a processor, cause the processor to perform operations. The operations include receiving image BEV features and receiving first radio detection and ranging (RADAR) BEV features. The first RADAR BEV features that are received are determined based on first RADAR data associated with a first data type. First normalized RADAR BEV features are determined, which includes rescaling the first RADAR BEV features using a first attention mechanism based on the image BEV features and the first RADAR BEV features. Fused data is determined that combines the first normalized RADAR BEV features and the image BEV features.

In an additional aspect of the disclosure, a vehicle includes an image sensor, a RADAR system, at least one processor and a memory coupled to the at least one processor. The at least one processor is configured to perform operations including receiving image BEV features and receiving first radio detection and ranging (RADAR) BEV features. The image BEV features that are received are determined based on image data received from the image sensor. The first RADAR BEV features that are received are determined based on first RADAR data associated with a first data type, the first RADAR data received from the RADAR system. Normalized RADAR BEV features are determined, which includes rescaling the first RADAR BEV features using a first attention mechanism based on the image BEV features and the first RADAR BEV features.

Fused data is determined that combines the normalized RADAR BEV features and the image BEV features.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHZ-7.125 GHZ) and FR2 (24.25 GHZ-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHZ-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD or TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
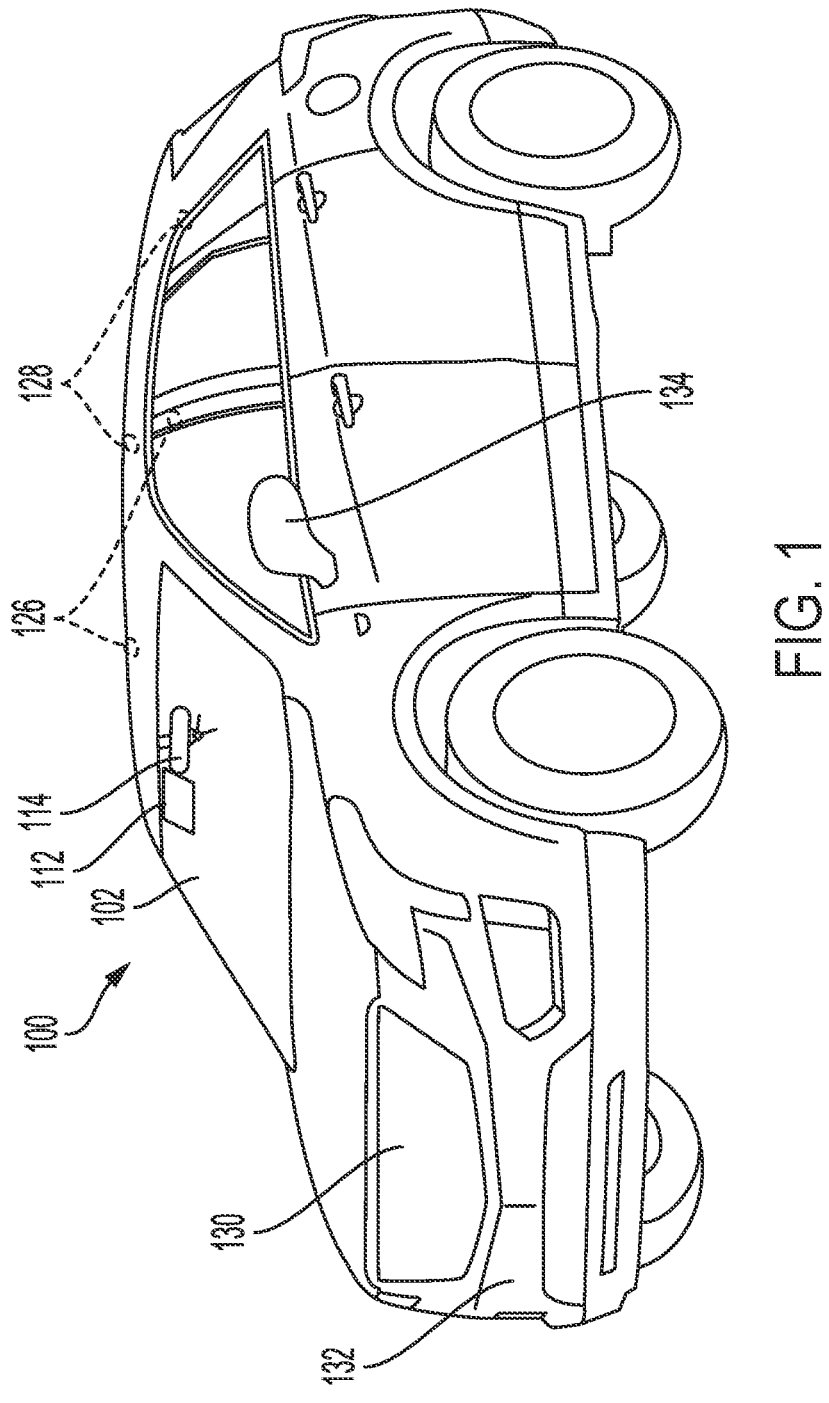
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support RADAR-camera fusion irrespective of the data format type of the RADAR data. The provided techniques leverage an image sensor of a camera, which is a common sensor with standardized intensity profiles, as an anchor to adaptively align different data format types of RADAR feature maps. For example, the provided techniques involve a radiometric normalizer that spatially and radiometrically aligns RADAR BEV features with the aid of a camera's BEV features. The radiometric normalizer executes an attention mechanism to learn the weights that determine the importance of different parts of the camera's BEV features for rescaling the RADAR BEV features. For example, if a certain region of the camera's BEV feature contains more useful information for rescaling the RADAR data, the attention mechanism can assign higher weights to that region, resulting in a more accurate rescaling of the RADAR data. The attention mechanism leverages ground-truth annotations of a camera and guides mapping the different RADAR data format types to BEV features with the camera's BEV grid features. For some RADAR data format types, the attention mechanism may be a cross-attention mechanism. For other RADAR data format types, the attention mechanism may be a self-attention mechanism. The attention weights can then be used to rescale the RADAR BEV features such that the importance of different parts of the camera's BEV feature is taken into account.

For example, a self-attention mechanism can be useful if the RADAR BEV features and camera BEV features have similar spatial and channel dimensions, allowing attendance directly to the most relevant parts of the input RADAR and image data. However, if the RADAR BEV features and camera BEV features have different spatial and channel dimensions, then a cross-attention mechanism may be more effective as it allows for aligning the different modalities and focusing on the most relevant parts of the camera BEV features for normalizing the RADAR BEV features while preserving the spatial dimension of the RADAR data. For example, in the case of RADAR BEV features, the spatial dimension could represent the range and azimuth angles of the RADAR sensor measurements. In this example, the range dimension represents the distance of objects from the RADAR sensor, while the azimuth dimension represents the angle between the RADAR sensor's line of sight and the object. In the case of the camera BEV features, the spatial dimension represents the two-dimensional coordinates of objects in the scene as seen from a top-down view. This representation by the camera BEV features allows for aligning the RADAR BEV features and camera BEV features and attending to the most relevant parts of the camera BEV features for normalizing the RADAR BEV features. Spatial dimension is important for aligning and processing different modalities of sensor data in autonomous driving applications, as it allows the driving systems to reason about the location and movement of objects in the scene.

In various aspects, the cross-attention mechanism may be a multi-scale cross-attention mechanism that can handle inputs of different sizes. For example, a multi-head cross-attention mechanism can be used where each head operates at a different scale, allowing the cross-attention mechanism to capture features at different levels of detail. Capturing features at different levels of detail can help to effectively combine information from the RADAR BEV features and camera BEV features at different spatial scales and improve the normalization process even if the maps have different dimensions.

Particular implementations of the subject matter described in this disclosure may be implemented to realize one or more of the following potential advantages or benefits. In some aspects, the present disclosure provides techniques for image processing that may be particularly beneficial in smart vehicle applications. For example, the proposed techniques enable a fusion pipeline to learn the importance of different parts of the camera's BEV features for rescaling the RADAR BEV features, which can improve the accuracy and efficiency of the radiometric normalization process. In particular, these techniques enable the fusion pipeline to adapt to different vehicular sensor configurations (e.g., different RADAR sensors) and environments, by learning the appropriate attention weights for each scenario.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
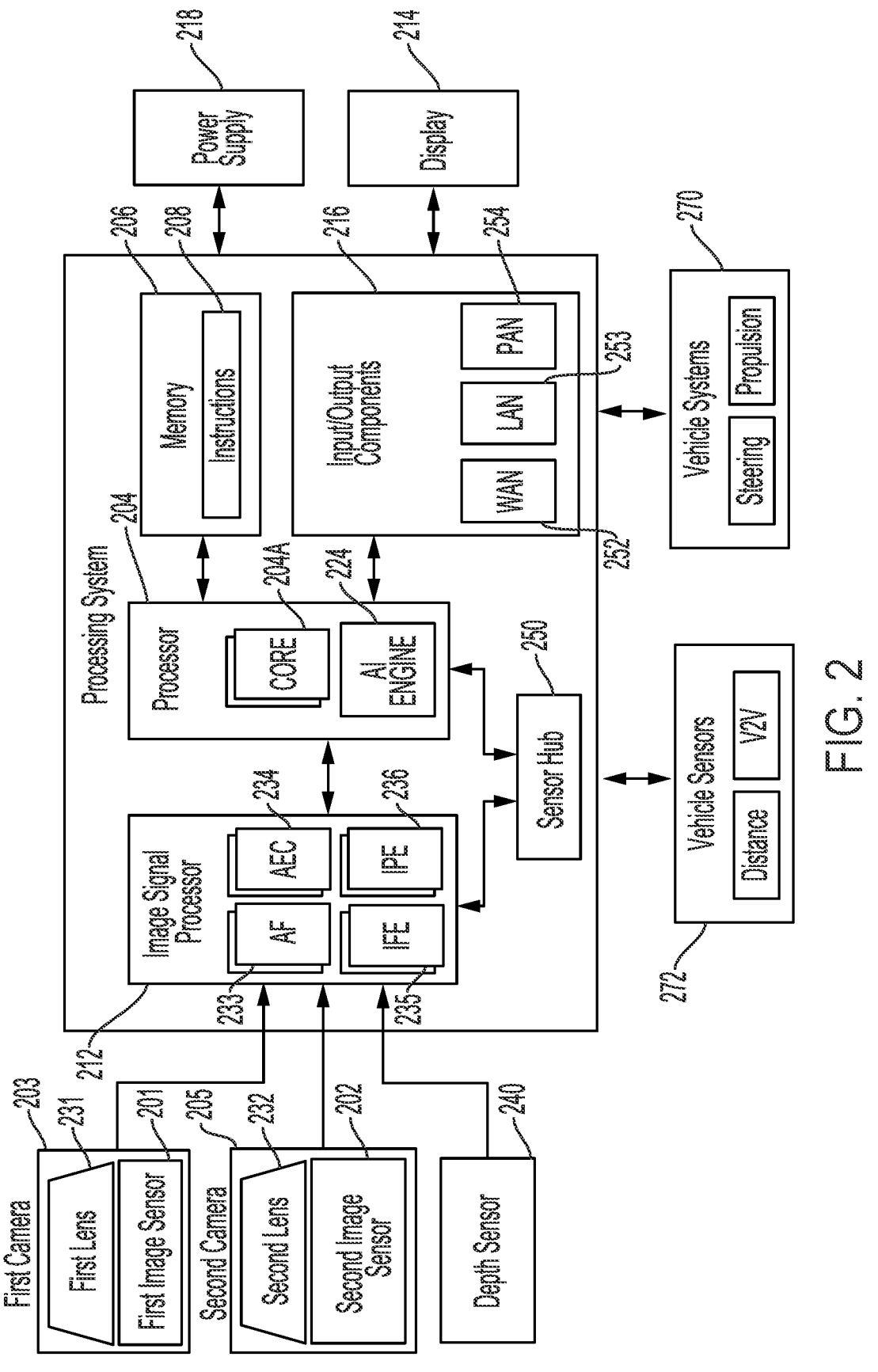
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination). Generating the output of commands to the vehicle systems 270 may be more adaptable to different types of vehicular sensor configurations, such as different types of RADAR systems, according to embodiments of this disclosure by using one or more attention mechanisms to rescale RADAR BEV features, extracted from different RADAR data types, based on camera image features such that the present techniques enable generating commands to the vehicle systems 270 irrespective of the RADAR system(s) included with the vehicle.

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
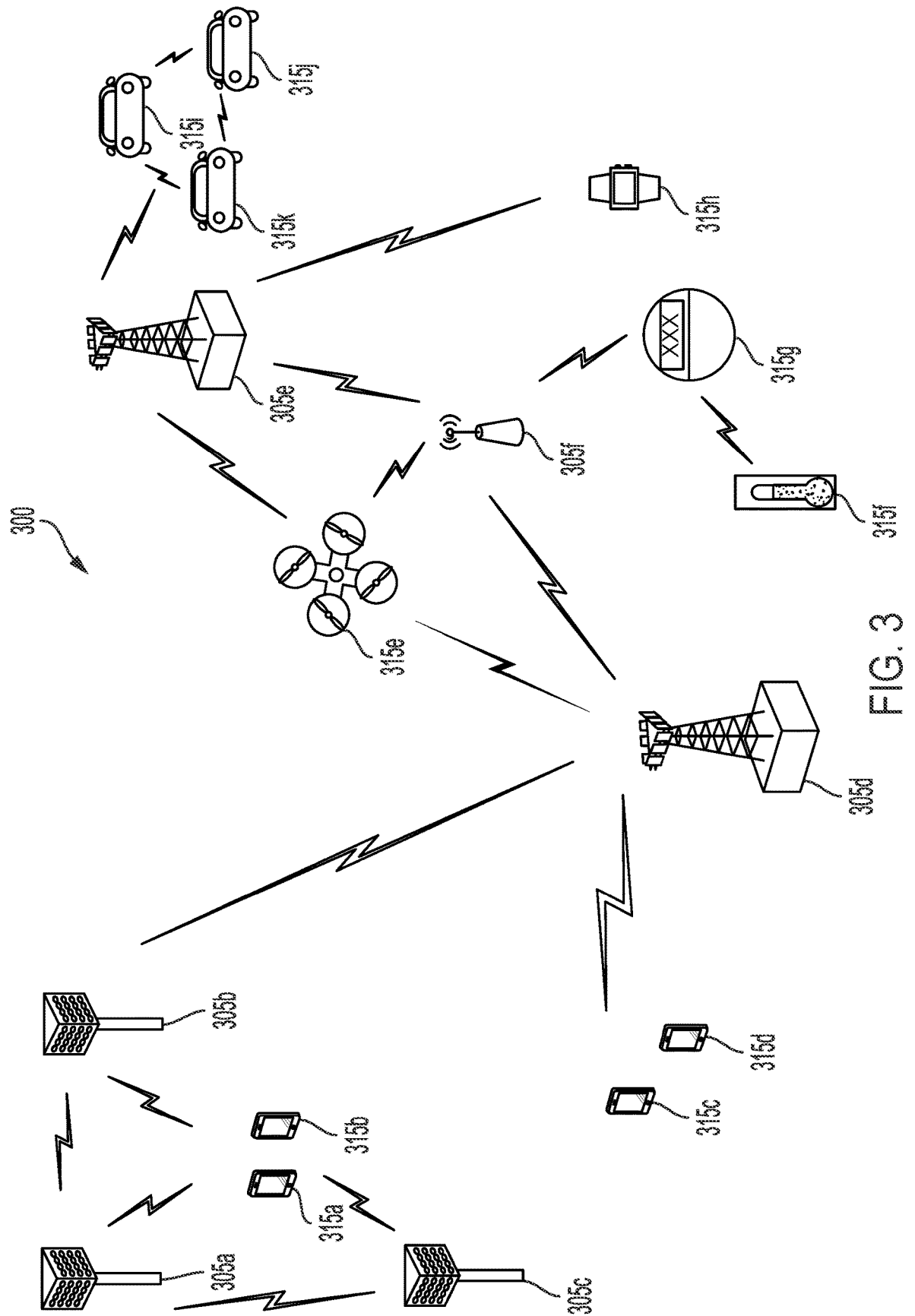
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305d and 305e are regular macro base stations, while base stations 305a-305c are macro base stations enabled with one of three-dimension (3D), full dimension (FD), or massive MIMO. Base stations 305a-305c take advantage of their higher dimension MIMO capabilities to exploit 3D beamforming in both elevation and azimuth beamforming to increase coverage and capacity. Base station 305f is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315*a-j* are specifically shown as vehicles, a vehicle may employ the communication configuration described with reference to any of the UEs 315*a*-315*k*.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315*a*-315*d* of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315*e*-315*k* illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305*a*-305*c* serve UEs 315*a* and 315*b* using 3D beamforming and coordinated spatial techniques, such as coordinated multipoint (COMP) or multi-connectivity. Macro base station 305*d* performs backhaul communications with base stations 305*a*-305*c*, as well as small cell, base station 305*f*. Macro base station 305*d* also transmits multicast services which are subscribed to and received by UEs 315*c* and 315*d*. Such multicast services may include mobile television or stream video, or may include other services for providing community information, such as weather emergencies or alerts, such as Amber alerts or gray alerts.

Wireless network 300 of implementations supports communications with ultra-reliable and redundant links for certain devices. Redundant communication links with UE 315*c* include from macro base stations 305*d* and 305*e*, as well as small cell base station 305*f*. Other machine type devices, such as UE 315*f* (thermometer), UE 315*g* (smart meter), and UE 315*h* (wearable device) may communicate through wireless network 300 either directly with base stations, such as small cell base station 305*f*, and macro base station 305*c*, or in multi-hop configurations by communicating with another user device which relays its information to the network, such as UE 315*f* communicating temperature measurement information to the smart meter, UE 315*g*, which is then reported to the network through small cell base station 305*f*. Wireless network 300 may also provide additional network efficiency through dynamic, low-latency TDD communications or low-latency FDD communications, such as in a vehicle-to-vehicle (V2V) mesh network between UEs 315*i*-315*k* communicating with macro base station 305*c*.

Aspects of the vehicular systems described with reference to, and shown in, FIG. 1, FIG. 2, and FIG. 3 may include enabling RADAR-camera fusion irrespective of the data format type of the RADAR data. The provided techniques leverage a camera image sensor as an anchor to adaptively normalizes different RADAR data format types. For example, the provided techniques involve a radiometric normalizer that spatially and radiometrically aligns RADAR BEV features with the aid of a camera's BEV features. An attention mechanism, such as a cross-attention mechanism or a self-attention mechanism, is utilized to learn the weights that determine the importance of different parts of the camera's BEV features for rescaling the RADAR BEV features.

Figure 4:
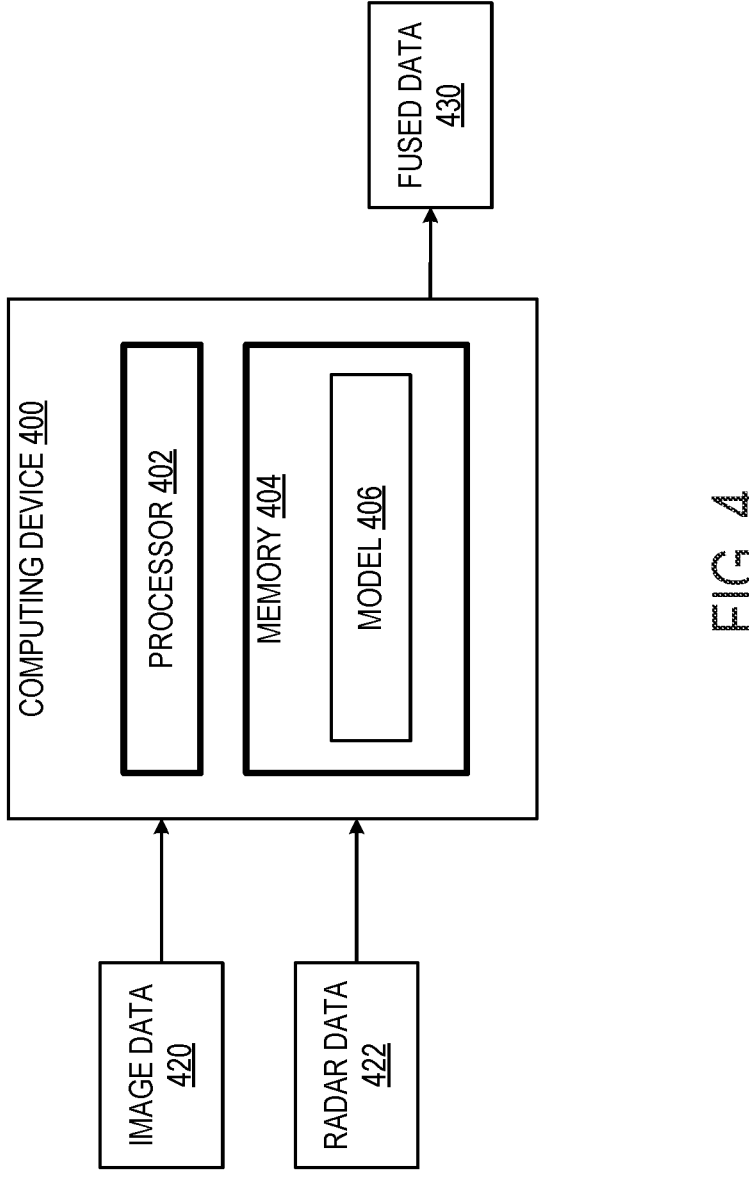
FIG. 4 is a block diagram illustrating an example system for RADAR-camera fusion according to one or more aspects of the disclosure.

FIG. 4 is a block diagram illustrating an example computing device 400 that determines fused data 430 from input image data 420 and RADAR data 422. In some aspects, various different RADAR systems generate different types of RADAR data (e.g., different RADAR signal format representations). In some aspects, a single RADAR system can generate different RADAR signal format representations. Specifically, from a single set of raw RADAR reflections, the single RADAR system can apply different types of signal processing and transformations to generate various representations that provide different perspectives on the RADAR data. The raw RADAR reflections contain all the needed information (e.g., the range, Doppler velocity, and azimuth angle) encoded into each reflection, and by applying various signal processing, the raw RADAR reflections can be reshaped into various representations without losing information.

As such, the RADAR data 422 may be one of various types of RADAR data formats. For example, RADAR data 422 may be one of the following data types: a range-doppler map, a range-azimuth map, point cloud data, 2D RADAR image data, a list of detected objects based on RADAR data, or a set of 3D bounding boxes based on RADAR data. Range-doppler map data types provide range and velocity information for each detected object, and is represented as a 2D range-doppler map where each pixel corresponds to a range-velocity pair. Range-azimuth map data types provide range and azimuth information for each detected object, and is represented as a 2D range-azimuth map where each pixel corresponds to a range-azimuth pair. Some RADAR sensors, such as Frequency Modulated Continuous Wave (FMCW) sensors, generate point cloud data types that provide a point cloud of the environment in which each point in the point cloud represents a detected object and contains the 3D position and velocity of the detected object. RADAR image data provides 2D representations of the environment generated from RADAR data, and typically show the intensity or power of the RADAR signal reflected from objects in the environment. Some RADAR sensors output a set of detected objects based on RADAR data along with the detected object's position, velocity, and other attributes. The set of detected objects can be represented as a list or table or as a set of 3D bounding boxes.

Computing device 400 may be implemented by the image processing configuration of FIG. 2 or by one or more of the components illustrated in FIG. 3. Computing device 400 includes a processor 402 (e.g., processor 204) coupled to a memory 404 (e.g., memory 206). In various aspects, processor 402 may include more than one processor. For example, computing device 400 may include a first processor 402A (not shown) and a second processor 402B (not shown) that are each coupled to the memory 404. The first processor 402A may be in communication with the second processor 402B. The first processor 402A and the second processor 402B may each perform all of the operations performed by processor 402, or alternatively, the first processor 402A may only perform a first portion of the operations and the second processor 402B may only perform a second portion of the operations. In various aspects, memory 404 may include more than one memory. For example, computing device 400 may include the processor 402 coupled to a first memory 404A (not shown) and a second memory 404B (not shown). The first memory 404A and the second memory 404B may each store all of the processor-executable code for all of the operations of processor 402, or alternatively, the first memory 404A may only store a first portion of the processor-executable code and the second memory 404B may only store a second portion of the processor-executable code. In another example, computing device 400 may include the first processor 402A and the second processor 402B that are each coupled to a first memory 404A (not shown) and a second memory 404B (not shown). In another example, computing device 400 may include the first processor 402A coupled to the first memory 404A, but not to the second memory 404B, and the second processor 402B coupled to the second memory 404B, but not to the first memory 404B. In aspects in which computing device 400 includes two or more processors 402, the two or more processors 402 may be included with the same computing device 400, or may be suitably separated among two or more computing devices 400. In aspects in which computing device 400 includes two or more memories 404, the two or more memories 404 may be included with the same computing device 400, or may be suitably separated among two or more computing devices 400. The computing device(s) 400 with which the two or more memories 404 are included may be the same computing device(s) 400 with which the at least one processor 402 is included or may be different. For example, a processor 402 may be included with a first computing device 400A (not shown) and a memory 404 may be included with a second computing device 400B (not shown), e.g., a server, in communication with the first computing device 400A over a network.

Memory 404 stores at least one model 406. For example, the at least one model 406 may be stored on a single memory 404. In another example, the first memory 404A stores a first model of the at least one model 406 and the second memory 404B stores a second model of at least one model 406. The at least one model 406 is trained to perform RADAR-camera fusion, and in some aspects, object detection.

For example, the model 406 may be implemented as one or more machine learning models, including supervised learning models, unsupervised learning models, other types of machine learning models, and/or other types of predictive models. For example, the model 406 may be implemented as one or more of a neural network, a transformer model, a decision tree model, a support vector machine, a Bayesian network, a classifier model, a regression model, and the like. Model 406 may be trained based on training data to determine fused data 430 that combines image data 420 and RADAR data 422. For example, one or more training datasets may be used that contain image data BEV features and RADAR data BEV features. An attention mechanism may be utilized to learn attention weights when training model 406. The training data sets may specify one or more expected outputs. For example, expected fused data, expected bounding boxes, or expected objects to be detected. Parameters of model 406 may be updated based on whether model 406 generates correct outputs when compared to the expected outputs. In particular, model 406 may receive one or more pieces of input data from the training data sets that are associated with a plurality of expected outputs. Model 406 may generate predicted outputs based on a current configuration of model 406. The predicted outputs may be compared to the expected outputs and one or more parameter updates may be computed based on differences between the predicted outputs and the expected outputs. In particular, the parameters may include weights (e.g., priorities) for different features and combinations of features (e.g., camera BEV features and RADAR BEV features). The parameter updates to model 406 may include updating one or more of the features analyzed and/or the weights assigned to different features or combinations of features (e.g., relative to the current configuration of model 406).

Figure 5:
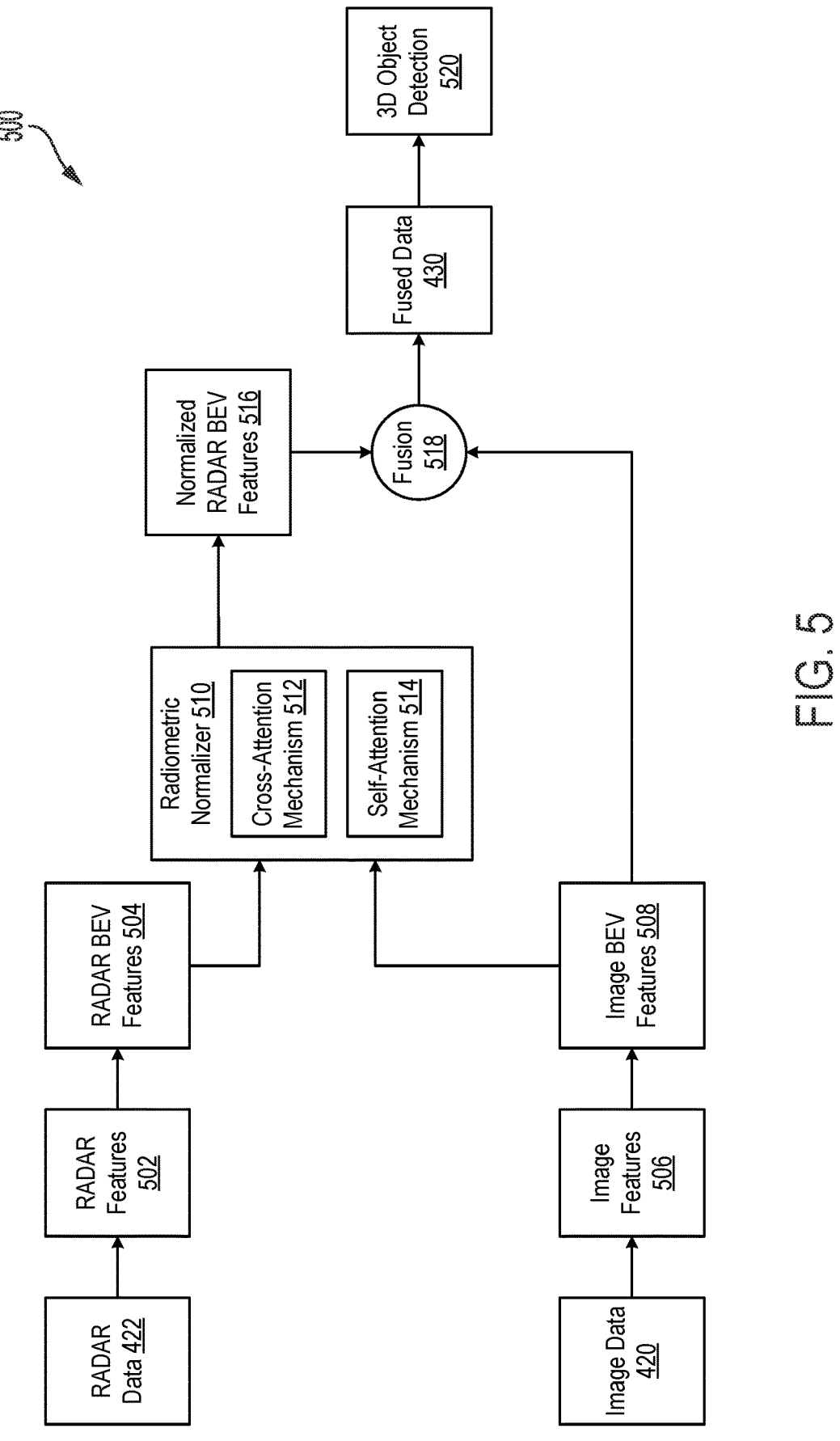
FIG. 5 is a block diagram illustrating an example pipeline for RADAR-camera fusion according to one or more aspects of the disclosure.

FIG. 5 is a flow diagram of an example pipeline 500 for determining the fused data 430. The pipeline 500 may be at least partially implemented by model 406. Pipeline 500 includes extracting RADAR features 502 from RADAR data 422. In some aspects, the RADAR features 502 may be of a data type that is already in the BEV grid such that the RADAR features 502 are also RADAR BEV features 504. For example, RADAR data types that are already in the BEV grid include range-doppler map data types and range-azimuth map data types. In other aspects, the RADAR features 502 may be transformed into RADAR BEV features 504. Pipeline 500 further includes extracting image features 506 from image data 420. The image features 506 are thereafter transformed into image BEV features 508. For example, the image features 506 may be transformed from perspective view (PV) to BEV.

The RADAR BEV features 504 and the image BEV features 508 may be input into a radiometric normalizer 510. The radiometric normalizer 510 leverages ground-truth annotations of the camera that captured the image data 420 and guides mapping the RADAR BEV features 504 to normalized BEV features with the camera's BEV grid features. Stated differently, the radiometric normalizer 510 uses the image BEV features 508 as an anchor to scale the RADAR BEV features 504 based on learned attention weights. For example, for certain types of RADAR data formats (e.g., radar signal format representations), the learned attention weights may be part of a cross-attention mechanism 512. For example, the cross-attention mechanism 512 may be utilized for each of range-doppler map data types, range-azimuth map data types, and point cloud data types of RADAR data.

An example cross-attention mechanism includes obtaining a query matrix Q from the RADAR data, with dimensions (batch_size, num_radar_points, d_model). Here, d_model is the dimension of the embedding for each RADAR point. Key and value matrices K and V are obtained from the camera BEV features, with dimensions (batch_size, num_camera_pixels, d_model). Here, d_model is the dimension of the embedding for each camera pixel. Attention weights A are then computed between the RADAR points and camera pixels, with dimensions (batch_size, num_radar_points, num_camera_pixels), using the following equation: $A = \text{softmax}(Q*K^T/\text{sqrt}(d\_k))$, where $d\_k$ is the dimension of the key vectors. A context vector C is computed for each RADAR point, with dimensions (batch_size, 1, d_model), by taking a weighted sum of the camera pixel embeddings V, using the attention weights A as the weights using the following equation: $C\_i=sum (A\_i*V)/sum (A\_i)$, where i ranges over the RADAR points. The context vectors $C\_i$ are concatenated for all RADAR points, resulting in a normalized feature vector for the RADAR BEV features, with dimensions (batch_size, num_radar_points*d_model). This example cross-attention mechanism enables fusion that attends to global features in the camera BEV features, while also capturing local dependencies within the RADAR BEV features.

In another example, for other types of RADAR data formats, the learned attention weights may be part of a self-attention mechanism 514. For example, the self-attention mechanism 514 may be utilized for each of 2D RADAR image data types, a list of detected objects data types, or a set of 3D bounding boxes data types of RADAR data. An example self-attention mechanism is described as follows by considering a RADAR BEV features tensor R of shape (B, C, Hr, Wr), where B is the batch size, C is the number of channels, and Hr and Wr are the height and width of the RADAR BEV feature grid, respectively. And also considering a camera BEV feature tensor C of shape (B, C', Hc, Wc), where C' is the number of channels in the camera BEV feature, and Hc and Wc are the height and width of the camera BEV feature grid. In this example scenario, the RADAR and camera BEV features will have different dimensions and channels. The self-attention mechanism enables obtaining a common BEV data tensor from the RADAR BEV tensors and camera BEV tensors. To normalize the RADAR BEV features using the camera BEV features, the camera BEV feature tensor C is transformed into three matrices: the query matrix Q, the key matrix K, and the value matrix V. In some aspects, this transformation is done by applying three convolutional layers to the camera BEV feature tensor C, resulting in three tensors Q, K, and V of shape (B, C, Hc, Wc). The attention weights A are then computed as the dot product of Q and K, scaled by a factor of sqrt (C), where C is the number of channels in the key matrix K. i.e. $A=softmax (Q*K\hat{}T/sqrt (C))$ where * denotes element-wise multiplication and $\hat{}T$ denotes matrix transpose. The resulting attention weights A are a set of scores that indicate the importance of each pixel in the camera BEV features for rescaling the corresponding pixel in the RADAR BEV features. The attention weights A are used to weight the value matrix V, resulting in a context vector C that summarizes the most relevant parts of the camera BEV feature for normalizing the RADAR BEV features, i.e., $C=A*V$. To obtain the normalized RADAR BEV features, the RADAR BEV tensor R element-wise divided by the context vector C: $N=R/C$, where N is the normalized RADAR BEV tensor of shape (B, C, Hr, Wr). In various aspects, the self-attention mechanism can be implemented as a neural network module that takes the RADAR BEV features and the camera BEV features as inputs, and outputs the normalized RADAR BEV features. The radiometric self-attention mechanism can be repeated multiple times to create a deep attention network that can learn complex relationships between the input data and the output.

Based on the RADAR BEV features 504, the image BEV features 508, and the respective learned attention weights, the radiometric normalizer 510 outputs normalized RADAR BEV features 516A. The normalized RADAR BEV features 516A are the RADAR BEV features 504 scaled based on the image BEV features 508 and the learned attention weights. Fusion 518 fuses the normalized RADAR BEV features 516A and the image BEV features 508 to determine fused data 430. Fusion 518 may be any suitable fusion method known in the art.

In some aspects, pipeline 500 may include 3D object detection 520 based on the fused data 430. In other aspects, the fused data 430 may be input into a separate pipeline for 3D object detection 520. In some aspects, commands may be sent to the vehicle systems 270 based on the objects detected.

Figure 6:
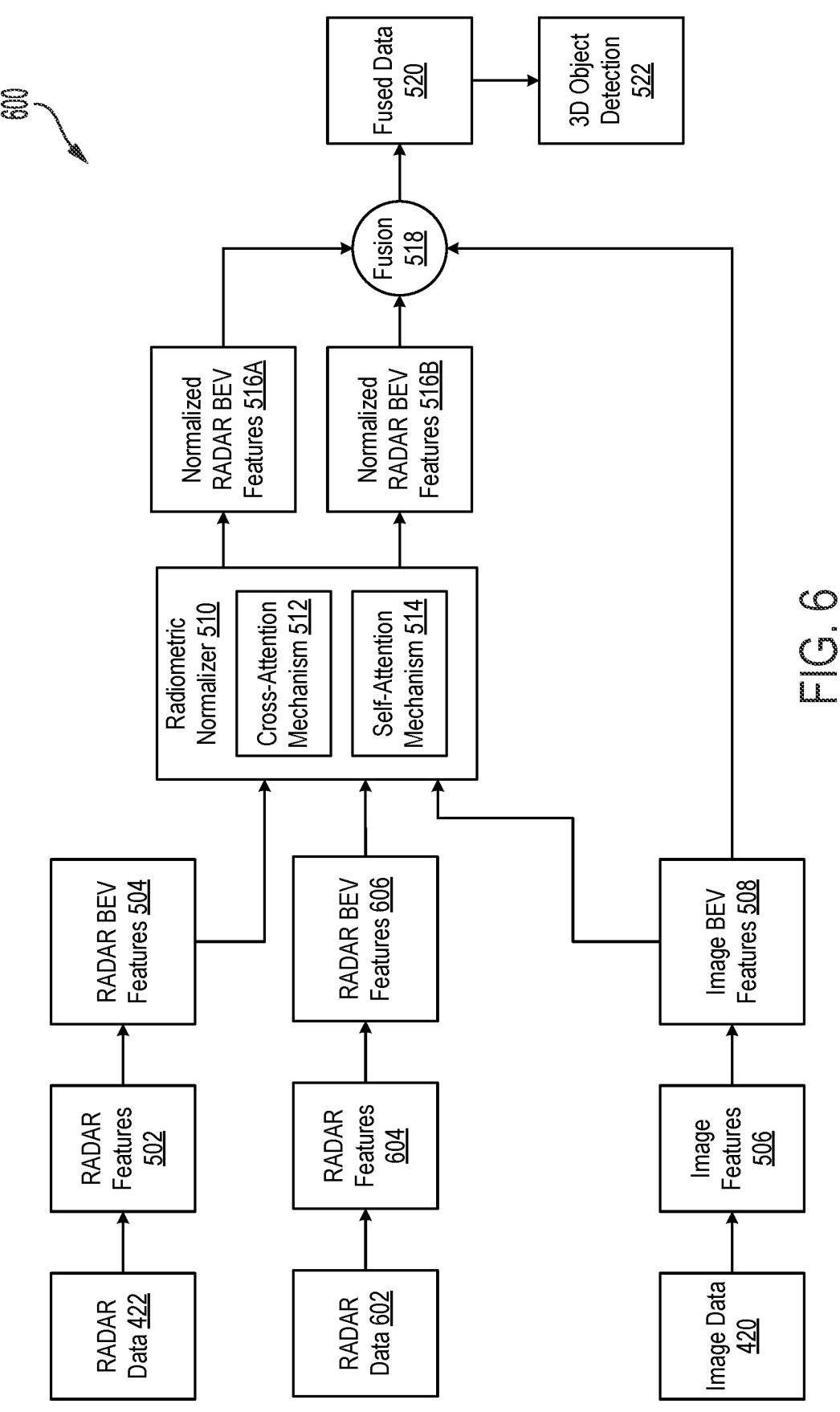
FIG. 6 is a block diagram illustrating an example pipeline for RADAR-camera fusion with two different RADAR data formats according to one or more aspects of the disclosure.

FIG. 6 is a flow diagram of an example pipeline 600 for determining the fused data 430. Pipeline 600 is the same as pipeline 500 except that pipeline 600 includes two different types of RADAR data, namely, RADAR data 422 and RADAR data 602. For example, the vehicle sensors 272 of vehicle 100 may include two different types of RADAR sensors. As such, only the differences between pipeline 500 and pipeline 600 will be discussed. Additionally, while the pipeline 600 includes two different types of RADAR data, the present techniques can be applied for more than two different types of RADAR data In an example, RADAR data 422 is a range-azimuth map data type and RADAR data 602 is a 2D RADAR image data type. RADAR features 604 are extracted from RADAR data 602. The RADAR features 604 may be transformed into RADAR BEV features 606. In this example, radiometric normalizer 510 scales RADAR BEV features 504 according to the image BEV features 508 and learned weights of the cross-attention mechanism 512, since RADAR data 422 is a range-azimuth map data type. Conversely, radiometric normalizer 510 scales RADAR BEV features 606 according to the image BEV features 508 and learned weights of the self-attention mechanism 514, since RADAR data 602 is a 2D RADAR image data type.

In the example pipeline 600, the radiometric normalizer 510 outputs normalized RADAR BEV features 516A that represent both RADAR data 422 and RADAR data 602. In other examples, the radiometric normalizer 510 may output a first set of normalized RADAR BEV features 516A associated with RADAR data 422 and a second set of normalized RADAR BEV features 516A associated with RADAR data 602. In such other examples, the first and second sets of normalized RADAR BEV features 516A may be fused with the image BEV features 508 at fusion 518.

While the above example includes RADAR data 422 associated with the cross-attention mechanism 512 and RADAR data 602 associated with the self-attention mechanism 514, it shall be understood that, in other examples, RADAR data 422 may be of a data type associated with the self-attention mechanism 514 or RADAR data 602 may be of a data type associated with the cross-attention mechanism 512. Pipeline 600 is also not limited to two different types of RADAR data. For example, the vehicle sensors 272 of vehicle 100 may include more than two different types of RADAR sensors.

Figure 7:
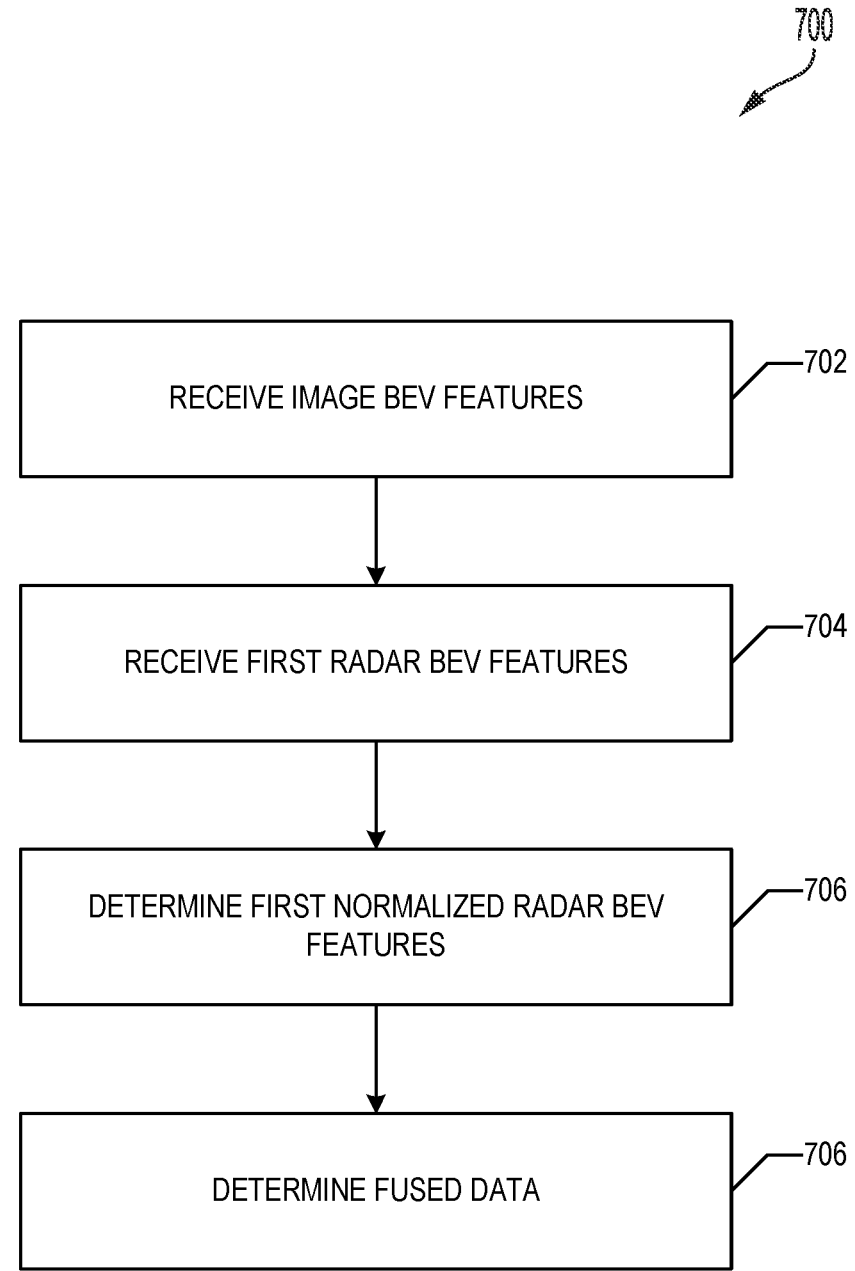
FIG. 7 is a flow chart illustrating an example method for RADAR-camera fusion according to one or more aspects of the disclosure.

One method of performing image processing according to embodiments described above is shown in FIG. 7. FIG. 7 is a flow chart illustrating an example method 700 for performing camera-RADAR. Method 700 includes, at block 702, receiving image BEV features (e.g., image BEV features 508). The image BEV features that are received are determined based on image data (e.g., the image data 420). In some aspects, method 700 includes receiving the image data from an image sensor (e.g., image sensor 201), and determining the image BEV features based on the image data received, rather than receiving the already determined image BEV features, though the method 700 is not limited as so in all aspects.

At block 704, first RADAR BEV features (e.g., RADAR BEV features 504) are received. The first RADAR BEV features that are received are determined based on first RADAR data (e.g., RADAR data 422) associated with a first data type. In some aspects, method 700 includes receiving the first RADAR data from a sensor (e.g., the vehicle sensors 272) of a RADAR system, and determining the first RADAR BEV features based on the first RADAR data received, rather than receiving the already determined first RADAR BEV features, though the method 700 is not limited as so in all aspects. In various aspects, the first data type may be a range-doppler map data type, a range-azimuth map data type, a point cloud data type, a 2D RADAR image data type, a list of detected objects data type, or a set of 3D bounding boxes data type. In some aspects, method 700 may include determining the first data type of the first RADAR data. For example, the first data type of the first RADAR data may be determined from metadata concatenated as additional feature vectors to the input first RADAR data. The metadata can be encoded as one-hot vectors, continuous-valued vectors, or a combination of both.

At block 706, normalized RADAR BEV features (e.g., normalized RADAR BEV features 516A) are determined. Determining the first normalized RADAR BEV includes rescaling the first RADAR BEV features using a first attention mechanism based on the image BEV features and the first RADAR BEV features. Stated differently, the first RADAR BEV features are scaled based on the image BEV features and learned weights of the attention mechanism to determine the normalized RADAR BEV features. In various aspects, the attention mechanism includes learned attention weights based on ground-truth annotations of a camera that captured image data on which the image BEV features are based. In some aspects, the first attention mechanism is a self-attention mechanism. In other aspects, the first attention mechanism is a cross-attention mechanism. For example, in at least some aspects, if the first data type is the range-doppler map data type, the range-azimuth map data type, or the point cloud data type, then the first attention mechanism is a cross-attention mechanism. In another example, in at least some aspects, if the first data type is the 2D RADAR image data type, the list of detected objects data type, or the set of 3D bounding boxes data type, then the attention mechanism is a self-attention mechanism.

In some aspects, method 700 includes receiving RADAR BEV features that are based on at least two different types of RADAR data. For example, method 700 may include receiving second RADAR BEV features (e.g., RADAR BEV features 606). The second RADAR BEV features that are received are determined based on second RADAR data (e.g., RADAR data 602) associated with a second data type. The second data type may be the same as, or different from, the first data type. In some aspects, method 700 includes receiving the second RADAR data from a sensor (e.g., the vehicle sensors 272) of a RADAR system, and determining the second RADAR BEV features based on the second RADAR data received, rather than receiving the already determined second RADAR BEV features, though the method 700 is not limited as so in all aspects.

In aspects including second RADAR BEV features, second normalized RADAR BEV features (e.g., normalized RADAR BEV features 516B) are determined. Determining the second normalized RADAR BEV includes rescaling the second RADAR BEV features using a second attention mechanism based on the image BEV features and the second RADAR BEV features. Stated differently, the second RADAR BEV features are scaled based on the image BEV features and learned weights of the second attention mechanism to determine the second normalized RADAR BEV features.

In some examples of aspects including second RADAR BEV features, the first attention mechanism is a cross-attention mechanism and the second attention mechanism is a self-attention mechanism. For example, the first data type may be a range-doppler map data type, a range-azimuth map data type, or a point cloud data type, such that the first attention mechanism is a cross-attention mechanism, and the second data type may be a 2D RADAR image data type, a list of detected objects data type, or a set of 3D bounding boxes data type, such that the second attention mechanism is a self-attention mechanism. In other examples, both the first and second attention mechanisms are either a cross-attention mechanism or a self-attention mechanism, but not both. For example, the first data type may be a range-doppler map data type, a range-azimuth map data type, or a point cloud data type, such that the first attention mechanism is a cross-attention mechanism, and the second data type may be a range-doppler map data type, a range-azimuth map data type, or a point cloud data type, such that the second attention mechanism is a cross-attention mechanism.

At block 708, fused data (e.g., fused data 430) is determined that combines the normalized RADAR BEV features and the image BEV features. The normalized RADAR BEV features and the image BEV features may be fused using any suitable, known fusion method in the art. In aspects including first normalized RADAR BEV features and second normalized RADAR BEV features, the fused data combines each of the first normalized RADAR BEV features, the s D'Souza did you ask him as a just virtual of the id. VI failure they would do it like everybody was here is here and then I Asked gotcha econd normalized RADAR BEV features, and the image data BEV features. In some aspects, method 700 further includes detecting an object based on the fused data. In some aspects, method 700 further includes controlling a function of a vehicle (e.g., vehicle 100) based on the object detected.

It is noted that one or more blocks (or operations) described with reference to FIGS. 4-7 may be combined with one or more blocks (or operations) described with reference to another of the figures. For example, one or more blocks (or operations) of FIG. 7 may be combined with one or more blocks (or operations) of FIGS. 1-4. As another example, one or more blocks associated with FIGS. 5-6 may be combined with one or more blocks associated with FIGS. 1-4.

In one or more aspects, techniques for supporting vehicular operations may include additional aspects, such as any single aspect or any combination of aspects described below or in connection with one or more other processes or devices described elsewhere herein. In a first aspect, an apparatus is configured to receive image BEV features and receive first radio detection and ranging (RADAR) BEV features. The first RADAR BEV features that are received are determined based on first RADAR data associated with a first data type. The apparatus determines first normalized RADAR BEV features, which includes rescaling the first RADAR BEV features using a first attention mechanism based on the image BEV features and the first RADAR BEV features. The apparatus further determines fused data that combines the first normalized RADAR BEV features and the image BEV features. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the first attention mechanism is a self-attention mechanism.

In a third aspect, in combination with one or more of the first aspect or the second aspect, the first attention mechanism is a cross-attention mechanism.

In a fourth aspect, in combination with one or more of the first aspect through the third aspect, the first data type is one of the data types in the group consisting of: a range-doppler map, a range-azimuth map, a point cloud, a 2D RADAR image, a list of detected objects based on the first RADAR data, and a set of 3D bounding boxes based on the first RADAR data.

In a fifth aspect, in combination with the fourth aspect, if the first data type is the range-doppler map data type, the range-azimuth map data type, or the point cloud data type, then the first attention mechanism is a cross-attention mechanism, and if the first data type is the 2D RADAR image type, the list of detected objects based on the first RADAR data type, or the set of 3D bounding boxes based on the first RADAR data type, then the attention mechanism is a self-attention mechanism.

In a sixth aspect, in combination with one or more of the first aspect through the fifth aspect, the apparatus is further configured to receive second RADAR BEV features that are determined based on second RADAR data associated with a second data type different than the first data type. The apparatus determines second normalized RADAR BEV features, which includes rescaling the second RADAR BEV features using a second attention mechanism based on the image BEV features and the second RADAR BEV features, and the fused data combines the first normalized RADAR BEV features, the second normalized RADAR BEV features, and the image BEV features.

In a seventh aspect, in combination with the sixth aspect, the first attention mechanism is a cross-attention mechanism and the second attention mechanism is a self-attention mechanism.

In an eighth aspect, in combination with one or more of the first aspect through the seventh aspect, the image BEV features are determined based on image data received from an image sensor.

In a ninth aspect, in combination with one or more of the first aspect through the eighth aspect, the attention mechanism includes learned attention weights based on ground-truth annotations of a camera that captured image data on which the image BEV features are based.

In a tenth aspect, in combination with one or more of the first aspect through the ninth aspect, the apparatus is further configured to detect an object based on the fused data, and control a function of a vehicle based on the object detected.

In an eleventh aspect, in combination with one or more of the second aspect through the tenth aspect, a vehicle includes an image sensor, a RADAR system, at least one processor and a memory coupled to the at least one processor. The at least one processor is configured to perform operations including receiving image BEV features and receiving first radio detection and ranging (RADAR) BEV features. The image BEV features that are received are determined based on image data received from the image sensor. The first RADAR BEV features that are received are determined based on first RADAR data associated with a first data type, the first RADAR data received from the RADAR system. Normalized RADAR BEV features are determined, which includes rescaling the first RADAR BEV features using a first attention mechanism based on the image BEV features and the first RADAR BEV features. Fused data is determined that combines the normalized RADAR BEV features and the image BEV features.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for image processing for use in a vehicle assistance system, comprising:
   receiving image Bird's Eye View (BEV) features;
   receiving first radio detection and ranging (RADAR) BEV features that are determined based on first RADAR data associated with a first data type;
   determining first normalized RADAR BEV features, which includes rescaling the first RADAR BEV features using a first attention mechanism based on the image BEV features and the first RADAR BEV features; and
   determining fused data that combines the first normalized RADAR BEV features and the image BEV features.

2. The method of claim 1, wherein the first attention mechanism is a self-attention mechanism.

3. The method of claim 1, wherein the first attention mechanism is a cross-attention mechanism.

4. The method of claim 1, wherein the first data type is one of the data types in the group consisting of: a range-doppler map, a range-azimuth map, a point cloud, a 2D RADAR image, a list of detected objects based on the first RADAR data, and a set of 3D bounding boxes based on the first RADAR data.

5. The method of claim 4, wherein if the first data type is the range-doppler map data type, the range-azimuth map data type, or the point cloud data type, then the first attention mechanism is a cross-attention mechanism, and if the first data type is the 2D RADAR image type, the list of detected objects based on the first RADAR data type, or the set of 3D bounding boxes based on the first RADAR data type, then the attention mechanism is a self-attention mechanism.

6. The method of claim 1, further comprising:

receiving second RADAR BEV features that are determined based on second RADAR data associated with a second data type different than the first data type; and determining second normalized RADAR BEV features, which includes rescaling the second RADAR BEV features using a second attention mechanism based on the image BEV features and the second RADAR BEV features, wherein the fused data combines the first normalized RADAR BEV features, the second normalized RADAR BEV features, and the image BEV features.

7. The method of claim 6, wherein the first attention mechanism is a cross-attention mechanism and the second attention mechanism is a self-attention mechanism.

8. The method of claim 1, wherein the image BEV features are determined based on image data received from an image sensor.

9. The method of claim 1, wherein the attention mechanism includes learned attention weights based on ground-truth annotations of a camera that captured image data on which the image BEV features are based.

10. The method of claim 1, further comprising:

detecting an object based on the fused data; and controlling a function of a vehicle based on the object detected.

11. An apparatus, comprising:

a memory storing processor-readable code; and at least one processor coupled to the memory, the at least one processor configured to execute the processor-readable code to cause the at least one processor to perform operations including:

receiving image Bird's Eye View (BEV) features;

receiving first radio detection and ranging (RADAR) BEV features that are determined based on first RADAR data associated with a first data type;

determining normalized RADAR BEV features, which includes rescaling the first RADAR BEV features using a first attention mechanism based on the image BEV features and the first RADAR BEV features; and determining fused data that combines the normalized RADAR BEV features and the image BEV features.

12. The apparatus of claim 11, wherein the first attention mechanism is a self-attention mechanism.

13. The apparatus of claim 11, wherein the first attention mechanism is a cross-attention mechanism.

14. The apparatus of claim 11, wherein the first data type is one of the data types in the group consisting of: a range-doppler map, a range-azimuth map, a point cloud, a 2D RADAR image, a list of detected objects, and a set of 3D bounding boxes.

15. The apparatus of claim 14, wherein if the first data type is the range-doppler map data type, the range-azimuth map data type, or the point cloud data type, then the first attention mechanism is a cross-attention mechanism, and if the first data type is the 2D RADAR image type, the list of detected objects based on the first RADAR data type, or the set of 3D bounding boxes based on the first RADAR data type, then the attention mechanism is a self-attention mechanism.

16. The apparatus of claim 11, wherein the operations further include:

receiving second RADAR BEV features that are determined based on second RADAR data associated with a second data type different than the first data type; and determining second normalized RADAR BEV features, which includes rescaling the second RADAR BEV features using a second attention mechanism based on the image BEV features and the second RADAR BEV features, wherein the fused data combines the first normalized RADAR BEV features, the second normalized RADAR BEV features, and the image BEV features.

17. The apparatus of claim 16, wherein the first attention mechanism is a cross-attention mechanism and the second attention mechanism is a self-attention mechanism.

18. The apparatus of claim 11, wherein the image BEV features are determined based on image data received from an image sensor.

19. The apparatus of claim 11, wherein the attention mechanism includes learned attention weights based on ground-truth annotations of a camera that captured image data on which the image BEV features are based.

20. The apparatus of claim 11, wherein the operations further include:

detecting an object based on the fused data; and controlling a function of a vehicle based on the object detected.

21. A non-transitory computer-readable medium storing instructions that, when executed by a processing system that includes one or more processors, cause the processing system to perform operations comprising:

receiving image Bird's Eye View (BEV) features;

receiving first radio detection and ranging (RADAR) BEV features that are determined based on first RADAR data associated with a first data type;

determining normalized RADAR BEV features, which includes rescaling the first RADAR BEV features using a first attention mechanism based on the image BEV features and the first RADAR BEV features; and determining fused data that combines the normalized RADAR BEV features and the image BEV features.

22. The non-transitory, computer-readable medium of claim 21, wherein the first attention mechanism is a self-attention mechanism or a cross-attention mechanism.

23. The non-transitory, computer-readable medium of claim 21, wherein the first data type is one of the data types in the group consisting of: a range-doppler map, a range-azimuth map, a point cloud, a 2D RADAR image, a list of detected objects, and a set of 3D bounding boxes.

24. The non-transitory, computer-readable medium of claim 21, wherein the operations further include:

receiving second RADAR BEV features that are determined based on second RADAR data associated with a second data type different than the first data type; and determining second normalized RADAR BEV features, which includes rescaling the second RADAR BEV features using a second attention mechanism based on the image BEV features and the second RADAR BEV features, wherein the fused data combines the first normalized RADAR BEV features, the second normalized RADAR BEV features, and the image BEV features.

25. The non-transitory, computer-readable medium of claim 21, wherein the attention mechanism includes learned attention weights based on ground-truth annotations of a camera that captured the image data.

26. A vehicle, comprising:

an image sensor;

a radio detection and ranging (RADAR) system; and a memory storing processor-readable code; and at least one processor coupled to the memory, the at least one processor in communication with the image sensor and the RADAR system and configured to execute the processor-readable code to cause the at least one processor to perform operations including:

receiving image Bird's Eye View (BEV) features that are determined based on image data received from the image sensor;

receiving first RADAR BEV features that are determined based on first RADAR data associated with a first data type, the first RADAR data received from the RADAR system;

determining normalized RADAR BEV features, which includes rescaling the first RADAR BEV features using a first attention mechanism based on the image BEV features and the first RADAR BEV features; and determining fused data that combines the normalized RADAR BEV features and the image BEV features.

27. The vehicle of claim 26, wherein the first attention mechanism is a self-attention mechanism or a cross-attention mechanism.

28. The vehicle of claim 26, wherein the RADAR system is a first RADAR system, the vehicle further comprising a second RADAR system in communication with the processing system, the operations including:

receiving second RADAR BEV features that are determined based on second RADAR data associated with a second data type different than the first data type, the second RADAR data received from the second RADAR system; and determining second normalized RADAR BEV features, which includes rescaling the second RADAR BEV features using a second attention mechanism based on the image BEV features and the second RADAR BEV features, wherein the fused data combines the first normalized RADAR BEV features, the second normalized RADAR BEV features, and the image BEV features.

29. The vehicle of claim 28, wherein the first data type is one of the data types in the group consisting of: a range-doppler map, a range-azimuth map, and a point cloud, and wherein the second data type is one of the data types in the group consisting of: a 2D RADAR image, a list of detected objects, and a set of 3D bounding boxes.

30. The vehicle of claim 26, wherein the attention mechanism includes learned attention weights based on ground-truth annotations of a camera that captured the image data.

* * * * *